United States Patent
Sato et al.

(10) Patent No.: US 8,165,519 B2
(45) Date of Patent: Apr. 24, 2012

(54) METHOD AND APPARATUS FOR BROADCAST CONTENT RELATED NOTIFICATION

(75) Inventors: Junichi Sato, Tokyo (JP); Xuan Liao, Singapore (SG); Zhongyang Huang, Singapore (SG)

(73) Assignee: Panasonic Corporation, Osaka (JP)

( * ) Notice: Subject to any disclaimer, the term of this patent is extended or adjusted under 35 U.S.C. 154(b) by 927 days.

(21) Appl. No.: 12/160,989

(22) PCT Filed: Jan. 17, 2007

(86) PCT No.: PCT/JP2007/051027
§ 371 (c)(1),
(2), (4) Date: Jul. 15, 2008

(87) PCT Pub. No.: WO2007/083824
PCT Pub. Date: Jul. 26, 2007

(65) Prior Publication Data
US 2010/0151782 A1  Jun. 17, 2010

Related U.S. Application Data

(60) Provisional application No. 60/759,055, filed on Jan. 17, 2006.

(51) Int. Cl.
*H04H 20/71* (2008.01)
*H04H 60/00* (2008.01)
*H04B 7/00* (2006.01)

(52) U.S. Cl. ............ 455/3.01; 455/3.06; 455/3.05; 455/66.1

(58) Field of Classification Search .......... 455/3.01, 455/3.06, 414.2
See application file for complete search history.

(56) References Cited

U.S. PATENT DOCUMENTS

| | | | | |
|---|---|---|---|---|
| 6,687,498 | B2* | 2/2004 | McKenna et al. | 455/422.1 |
| 6,791,472 | B1* | 9/2004 | Hoffberg | 340/905 |
| 6,928,262 | B1* | 8/2005 | Kanemitsu | 455/3.06 |
| 7,054,592 | B2* | 5/2006 | Tatsumi et al. | 455/3.06 |
| 7,113,739 | B2* | 9/2006 | Kawamata et al. | 455/3.02 |
| 7,212,781 | B2* | 5/2007 | Hikomoto | 455/3.01 |
| 7,366,461 | B1* | 4/2008 | Brown | 455/3.06 |
| 7,555,259 | B2* | 6/2009 | Kawamata et al. | 455/3.02 |
| 7,565,104 | B1* | 7/2009 | Brown et al. | 455/3.01 |

(Continued)

FOREIGN PATENT DOCUMENTS
JP  2003-348560  12/2003

OTHER PUBLICATIONS

F Kozamernik, "DAB—From Digital Radio towards Mobile Multimedia," EBU Technical Review, vol. 297, Jan. 31, 2004, pp. 1/19-19/19, XP002432803.

*Primary Examiner* — Tilahun B Gesesse
(74) *Attorney, Agent, or Firm* — Seed IP Law Group PLLC (57) ABSTRACT

A transmitting apparatus includes a generation unit configured to generate a notification message and a transmission unit configured to transmit the notification message. The notification message includes a broadcast identifier identifying a broadcast and timing control information indicating when media information related to and distinct from the broadcast is to be displayed.

A receiving apparatus includes a broadcast reception unit configured to receive broadcast and a notification message reception unit configured to extract broadcast identifiers and timing control information from the notification messages.

23 Claims, 11 Drawing Sheets

U.S. PATENT DOCUMENTS

| | | | |
|---|---|---|---|
| 7,583,929 B2 * | 9/2009 | Choi et al. | 455/3.01 |
| 7,596,302 B2 * | 9/2009 | Kato | 386/291 |
| 7,664,457 B2 * | 2/2010 | Kim et al. | 455/3.06 |
| 7,672,337 B2 * | 3/2010 | Steelberg et al. | 370/486 |
| 7,676,193 B2 * | 3/2010 | Zilliacus | 455/3.06 |
| 7,689,163 B2 * | 3/2010 | Tatsumi et al. | 455/3.06 |
| 7,751,804 B2 * | 7/2010 | Steelberg et al. | 455/414.2 |
| 7,801,492 B2 * | 9/2010 | Cantini et al. | 455/73 |
| 7,826,444 B2 * | 11/2010 | Irvin | 370/360 |
| 7,835,763 B2 * | 11/2010 | Kim et al. | 455/550.1 |
| 7,889,724 B2 * | 2/2011 | Irvin | 370/360 |
| 7,925,201 B2 * | 4/2011 | Irvin et al. | 455/3.01 |
| 2002/0095228 A1 | 7/2002 | Corts | |
| 2002/0132575 A1 * | 9/2002 | Kesling et al. | 455/2.01 |
| 2002/0137496 A1 * | 9/2002 | Nagaoka et al. | 455/414 |
| 2003/0131356 A1 | 7/2003 | Proehl | |
| 2005/0227672 A1 | 10/2005 | Lauzon | |
| 2007/0021051 A1 * | 1/2007 | Choi et al. | 455/3.01 |
| 2009/0029644 A1 * | 1/2009 | Sue et al. | 455/3.02 |
| 2009/0221229 A1 * | 9/2009 | Baumgartner | 455/3.06 |

* cited by examiner

METHOD AND APPARATUS FOR BROADCAST CONTENT RELATED NOTIFICATION

This application is a 35 USC 371 National Stage application of International Application No. PCT/JP2007/051027 filed Jan. 17, 2007 which is based on U.S. Provisional Application No. 60/759,055 filed Jan. 17, 2006.

TECHNICAL FIELD

The present invention relates to generating, transmitting, receiving, and processing broadcast content related notification messages in broadcasting environment, and, more particularly, in mobile broadcasting environment.

BACKGROUND ART

Broadcast is a radio communication service in which transmissions are intended for direct reception by the general public. This service may include sound transmissions, television transmissions or other types of transmissions. Broadcast Service is a "content package" suitable for simultaneous distribution to many recipients (potentially) without knowing the recipient. Either each receiver has similar receiving devices or the content package includes information that allows the client to process the content according to its current conditions. Mobile Broadcast Services refer to a broad range of broadcast services, which make use both of one-to-many communication paradigm and mobile networks and infrastructure. Recent developments in terminal technologies and digital broadcast systems enable broadcast services also in the mobile environment. This, in turn, enables distribution of rich, dynamic and bandwidth-consuming media broadcast content to a large mobile audience.

By the development of advanced digital broadcast technologies including OMA BOAST, DVB IPDC, 3GPP MBMS, 3GPP2BCMCS, ISDB-T, WLAN, and DAB, nowadays distribution of rich and dynamic broadcast content and related auxiliary data (e.g., advertisement) to many mobile terminals is possible. In digital broadcast area, metadata is generated by broadcast content or service providers prior to the distribution of the actual broadcast content. The metadata describing broadcast services and contents is usually called "service guide" or "program guide." The service guide or program guide facilitates the terminals and the users to find out what broadcast service or contents are available at what time and how to access them. However, service guide or program guide is relatively static because they are produced by broadcast service providers before the actual broadcast content is broadcast. Making abrupt changes on the broadcast service or content and/or its related auxiliary data, or dynamically inserting supplementary data of broadcast service or content is not supported by using service guide or program guide.

On the other hand, notifications are also used in prior arts to notify general public emergencies or events related to broadcast services. Patent US20050227672, filed in 2004, discloses a system and method for delivery of civil emergency notifications to wireless devices in a predetermined geographical area. Patent US20030131356 more particularly discloses a system and method for alerting a viewer of a broadcast of a program. JP2003348560 discloses a method similar to US20030131356 for realizing broadcast start notification service to prevent a viewer from losing the opportunity of watching a program that the viewer wants to watch in real time.

DISCLOSURE OF INVENTION

[Problems to be Solved]

This invention is directed to solving the following problems with the aforementioned background art:

First, conventionally, metadata describing broadcast services and contents, usually called "service guide" or "program guide", is generated by broadcast content or service providers prior to the distribution of the actual broadcast content and is used to help the terminals and the users find out what broadcast service or content are available at what time and how to access them. The metadata in service guide or program guide is pre-defined by content providers or service providers at least a few days, if not a few weeks, before the occurrence of the actual content broadcasting. Information related to the dynamic changes on broadcast content (e.g., temporary shift of the schedule or access entry point, new promotions for subscription, start alert for broadcast content, dynamic insertion of advertisements, etc.) is difficult to be promptly conveyed to the affected users and terminals using service guide or program guide.

The notification in US20050227672 also cannot circulate sudden changes on broadcast contents or trigger dynamic insertion of auxiliary media into the presentation of related broadcast content. The notification system, apparatus and method in this technique are only used to deliver the mobile audiences of immense or forthcoming emergencies in a predetermined geographical area. There are no disclosed means to associate notification messages with broadcast content and communicate the dynamic or unexpected changes on the related broadcast content with terminals or users. The notification system and method of US20030131356 enable the viewers to designate programs that he is interested in at the time it is advertised, and subsequently when the broadcast of the identified program is about to air, a reminder notification is sent out to remind the viewer of the broadcast, the viewer then can select the program to view. JP2003348560 discloses a similar broadcast start notification service provided with the steps of receiving viewing-desired program information from broadcast terminal devices from a number of viewers and registering the viewing-desired program information for each viewer; acquiring a broadcasting start time of a particular program shown by the viewing-desired program information on the basis of program scheduling information about a broadcast schedule of individual programs; transmitting broadcasting start notification mail to the portable information terminals of the viewers who wanted to watch the particular program at a prescribed time ahead of the acquired broadcasting start time; and transmitting streams constituting the program at the broadcasting start time based on the program scheduling information. The first disadvantage of the above two inventions is that the terminal devices must have uplink channel to inform the server-side on his interested content, then the service-side can notify the users of the start of the identified program, and therefore this technique can not be applied to terminal devices which only support broadcast downlink. Next, the point-to-point communication manner between the server and terminals gives server-end extra workload for receiving terminal designation, recording and managing these designations, and send the notification to relevant terminals one by one as the identified program is about to broadcast. This overhead increases significantly as the number of such designations is increased. Further these prior acts only solve the problem of notifying the start of broadcast content, but did not explore more flexible and extensible mechanism of notifications to circulate various broadcast content related messages to a plurality of mobile terminals, especially messages those dynamic or unexpected events related to the broadcast contents. The method disclosed in this invention overcomes the above shortcomings in US20030131356 and JP2003348560. This invention uses uni-directional broadcast channel to deliver notification messages to a plurality of terminal devices. The association of the notification messages with the broadcast content is indicated by specifying the related broadcast content identifiers within the notification message. By this means the terminals can filter the received notification messages based on the users' interest, associate them with the related broadcast content, and process the broadcast content related notifications according to the presentation rules.

[Means for Solving the Problems]

According to the features of this invention, the system and method provides an efficient way to dynamically describe and notify the broadcast content related events or changes to one or multiple terminals or users.

Figure 1:
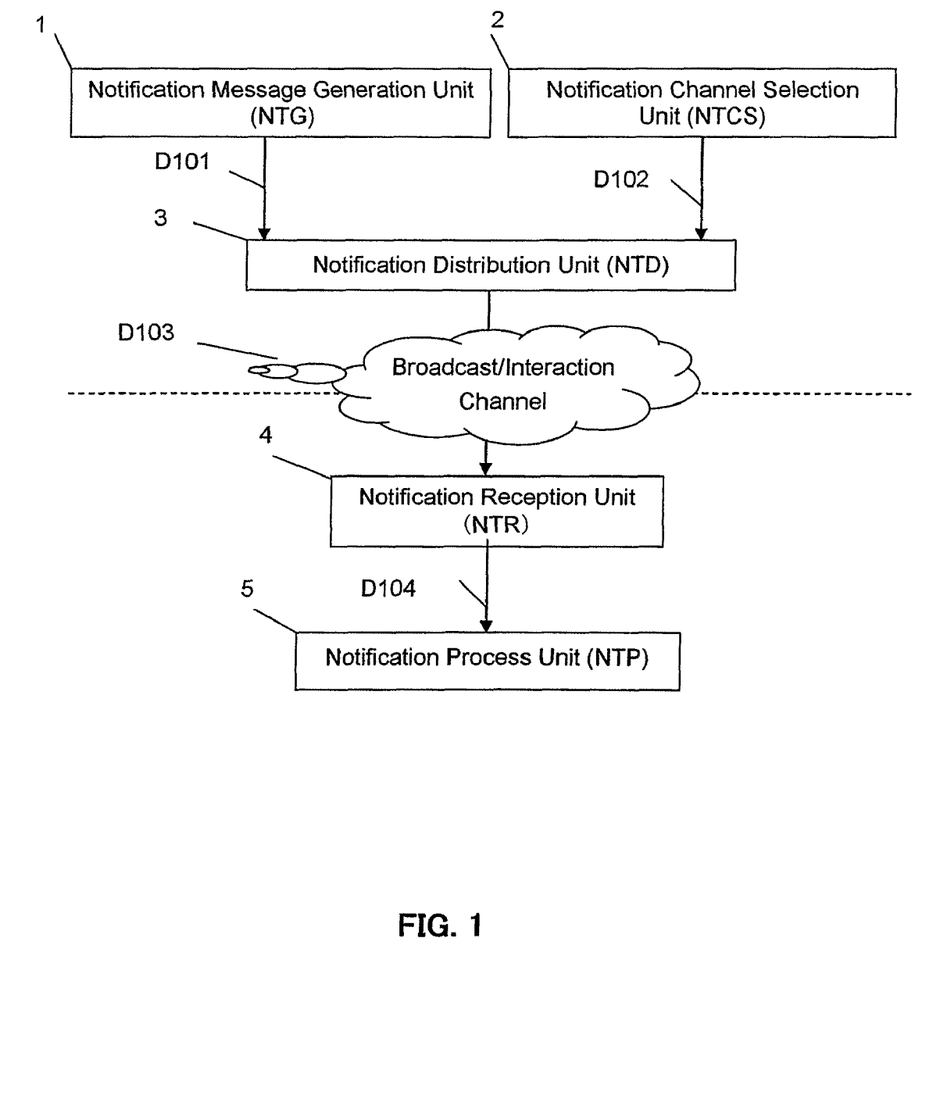
FIG. 1 is a diagram of the system for delivering notification messages over broadcast or interaction channel.

According to one aspect of the invention shown in FIG. 1, a system for delivering broadcast content related notification messages to one or multiple terminals comprises: a notification message generation unit (NTG) 1 to generate a notification message with association with the related broadcast content; a notification channel selection unit (NTCS) 2 to select a notification channel to be used for delivery of the notification message if there are multiple notification channel to be used for delivery; a notification distribution unit (NTD) 3 to transmit the notification message to one or multiple terminals via the selected notification channel; a notification reception unit (NTR) 4 to receive the notification message from the notification channel; and a notification process unit (NTP) 5 to process the notification message.

According to another aspect of the invention, a method for delivering broadcast content related notification messages to one or multiple terminals comprises: the step of generating a broadcast content related notification message comprising at least one or multiple related broadcast content identifiers and notification event description; the step of selecting a notification channel to be used for delivery of the notification message; the step of transmitting the notification message to one or multiple terminals via the selected notification channel; the step of receiving the notification messages at terminals from the notification channel; and the step of processing the notification messages at the terminals according to the related broadcast content identifiers, notification event description, the notification presentation rule and other information specified in the notification.

[Effect of the Invention]

Advantages of the present invention include, but are not limited to, the following.

First, the present invention provides a flexible and efficient method for service providers or content providers to notify broadcast services, contents or programs related information to one or multiple terminals or users simultaneously, especially sudden changes on the broadcast services, contents or programs. These changes are dynamic, temporary, unexpected or relative to the presentation of the related broadcast content which can be file download content or real-time streaming content or non-real-time streaming content, for instance, temporary shift of the schedule or access entry point of the broadcast content, new promotional events for the broadcast content subscription, start alert for broadcast content, dynamic insertion of advertisements on account of the implicit time variability of the related broadcast live sports match (e.g. time-outs and overtime continuation). With this invention, broadcast service providers can actively and efficiently communicate with their users and terminals to deliver the latest information on their interested broadcast services, contents or programs. Broadcast service providers also can dynamically trigger the download, storage or insertion of the broadcast content related auxiliary data as the supplementary media of the broadcast content, consequently enhancing user satisfaction of the broadcasting services.

Next, notification messages in this invention are indicated with identifiers of the related broadcast content, and therefore enable the terminal devices to process and store the notifications only of the users' interests or subscription. If required, the terminal devices can also associate the presentation of the notification or the notification triggered media data with the presentation of the related broadcast content, therefore providing users with an integrated viewing experience of broadcast content and its related notification events.

Meanwhile, this invention extends the usage of traditional notification messages from notifying forthcoming emergencies or start of broadcast program. With this invention, the legacy notification systems and apparatuses with small extensions can be re-used to assist and support the highly dynamic and customized broadcast services, particularly mobile broadcast services, and therefore the overall cost and complexity of the notification system for broadcast services can be significantly reduced.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BEST MODE FOR CARRYING OUT THE INVENTION

With reference to the accompanying drawings, the preferred embodiments of the present invention are described as follows.

Firstly, the general system of the invention is described with reference to FIG. 1. Broadcast content related notification messages D101 are generated by Notification Message Generation Unit 1 (NTG). If multiple notification channels are available to deliver the notification message, Notification Channel Selection Unit 2 (NTCS) will select the most suitable channel D102 for every specific notification message according to the predetermined selection rules. If there is only one notification channel available, this unit will not function. The generated notification messages D103 are distributed to one or multiple terminals by Notification Distribution Unit 3 (NTD) via the notification channels selected by NTCS 2. The notification channel can be broadcast channel or interaction channel. If it is broadcast channel, the reception end will be multiple terminals; if it is interaction channel, the reception end will be a single terminal. At terminal end, Notification Reception Unit 4 (NTR) receives the notification message from the notification channel and passes the notification message D104 to Notification Process Unit 5 (NTP). Notification Process Unit will process this notification message if immediate action is required as indicated in the notification message. Otherwise, the notification will be stored until the specified processing timing arrives.

Figure 2:
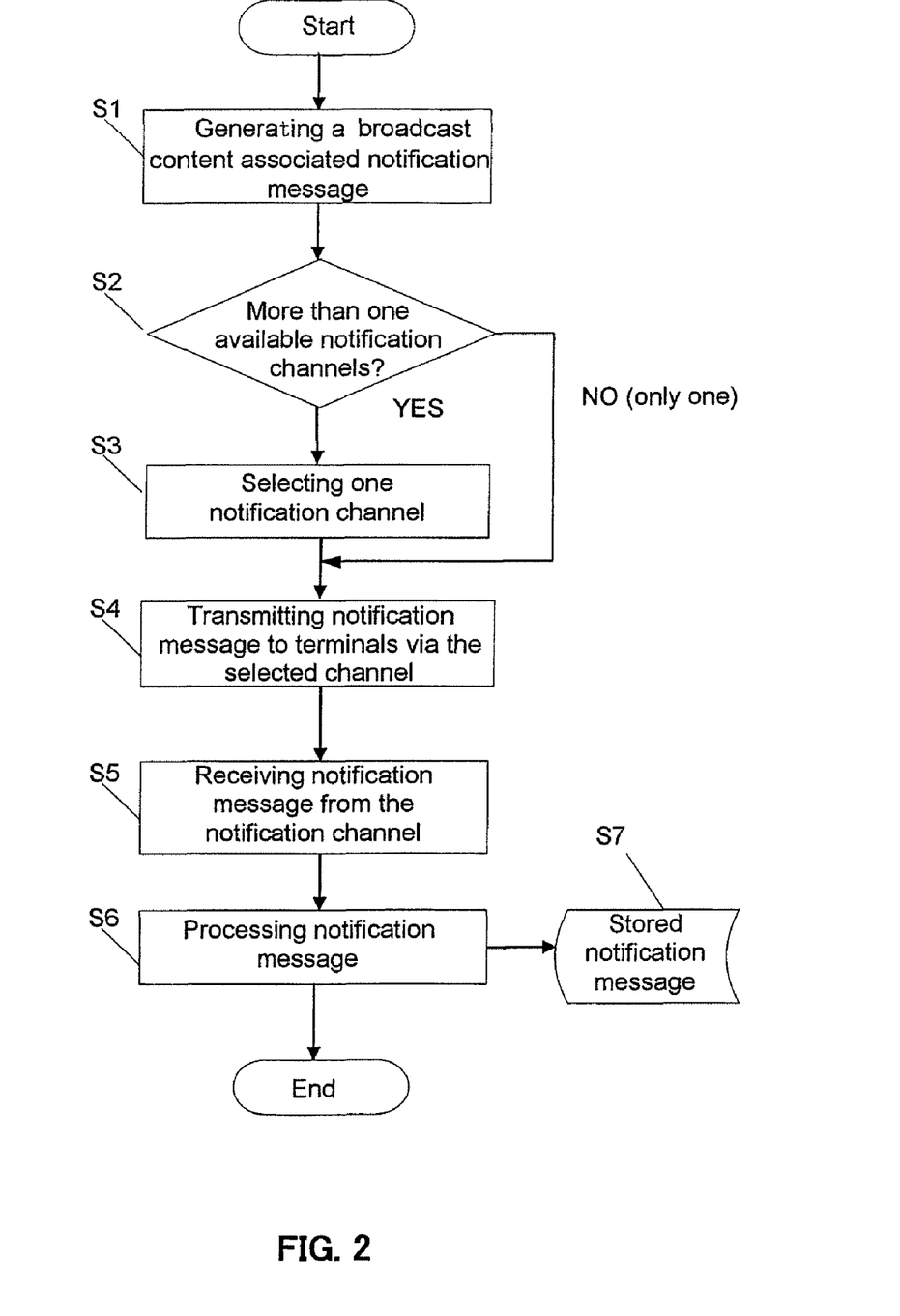
FIG. 2 is a flowchart of the method for delivering broadcast content related notification messages.

In FIG. 2, the general method of the invention is described. First, a broadcast content related notification message is generated by integrating necessary information, especially the identifier of the related broadcast content with a standardized or proprietary format (Step S1 is a new feature of comparison with normal notification message and will be elaborated in FIG. 3 and FIG. 11). Then it is checked that how many notification channels are available for notification delivery (Step S2). If there is only one notification channel, the notification message will be directly prepared for transmission via this channel. If there are more than one notification channels, one of the notification channels will be selected for use (Step S3). One possible scenario is that every broadcast service has one dedicated notification channel to deliver all notifications related to this broadcast service, thereby enabling the terminal users to receive only the notifications which are from the notification channels dedicated to their interested or subscribed broadcast services, and the users will not be annoyed by other irrelevant notifications. After Step S3, the notification message is transmitted to one or multiple terminals via the selected notification channel (Step S4). At terminal end, the terminal receives the notification message from the notification channel (Step S5) and process the received notification messages (Step S6). If the notification message needs to be processed immediately, then corresponding actions will be taken (e.g., displaying the schedule change of the related broadcast content to users). If the notification message is required to be processed at a later time, the notification massage will be stored (Step S7). The notification message will be activated for process when the specified processing time arrives (Step S6), for example, to trigger the insertion and rendering of an advertisement exactly before the rendering of the related broadcast content which is scheduled for tomorrow midnight. To further explain the internal structure of NTG 1 and the possible steps to generate a broadcast content related notification message, FIG. 12 and FIG. 3 are shown and described below.

Figure 12:
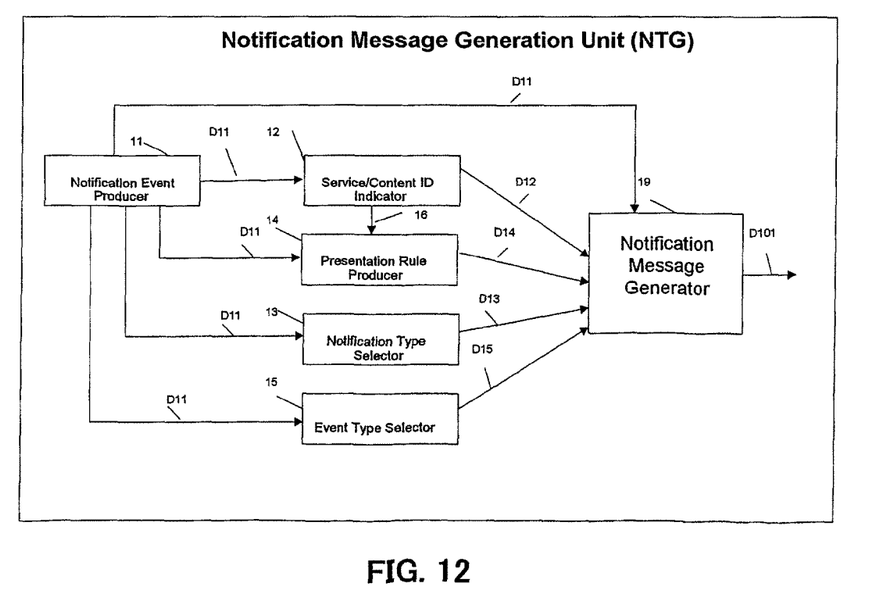
FIG. 12 is a block diagram of Notification Message Generation Unit (NTG)

In FIG. 12, the possible internal structure of Notification Message Generation Unit 1 (NTG) is illustrated. In this diagram NTG contains six modules 11, 12, 13, 14, 15 and 19. Notification Event Producer 11 defines and produces the notification event D11, it describes the detailed information or data this notification wants to inform the terminals or the users. If this notification is related with any broadcast content, the notification event D11 will also be transferred to Service/Content ID Indicator 12. Service/Content ID Indicator 12 may use D11 to abstract and find out the unified identifiers or the unified metadata identifiers D12 (e.g., URI and URL) of the related broadcast service or content. Meanwhile based on D11, Notification Type elector 13 determines the notification type D13 of this notification message (user-oriented or terminal-oriented), Presentation Rule Producer 14 describes the presentation rules D14 of the notification or the auxiliary data trigger by the notification; and Event Type Selector 15 determines the event type D15 of the notification. If the presentation of the notification or the auxiliary data triggered by the notification needs to be synchronized with the presentation of the related broadcast content, D11 will also be needed by producer 14 to generate the presentation rules D14.

The above data D11, D12, D13, D14 and D14 output from 11, 12, 13, 14, 15 are conveyed into Notification Message Generator 19 and are assembled thereto generate a broadcast content related notification message D101 according to standardized or proprietary format. Among 11, 12, 13, 14 and 15, 11 and 12 are the most important modules because they produce the basis information of a broadcast content related notification. By generating and including D11 and D12 into a notification, the end users can quickly get the up-to-date information or update on their interested or subscribed services or content in the form of notification, and the processing and presentation of such notification can be closely related even synchronized with the related broadcast content. Therefore D11 and D12 will always be produced and included in the broadcast content related notification message. However, D13, D14, D15 or other data like the valid term of notification message may not be necessary in every notification and hence may not be generated from the corresponding modules.

Figure 3:
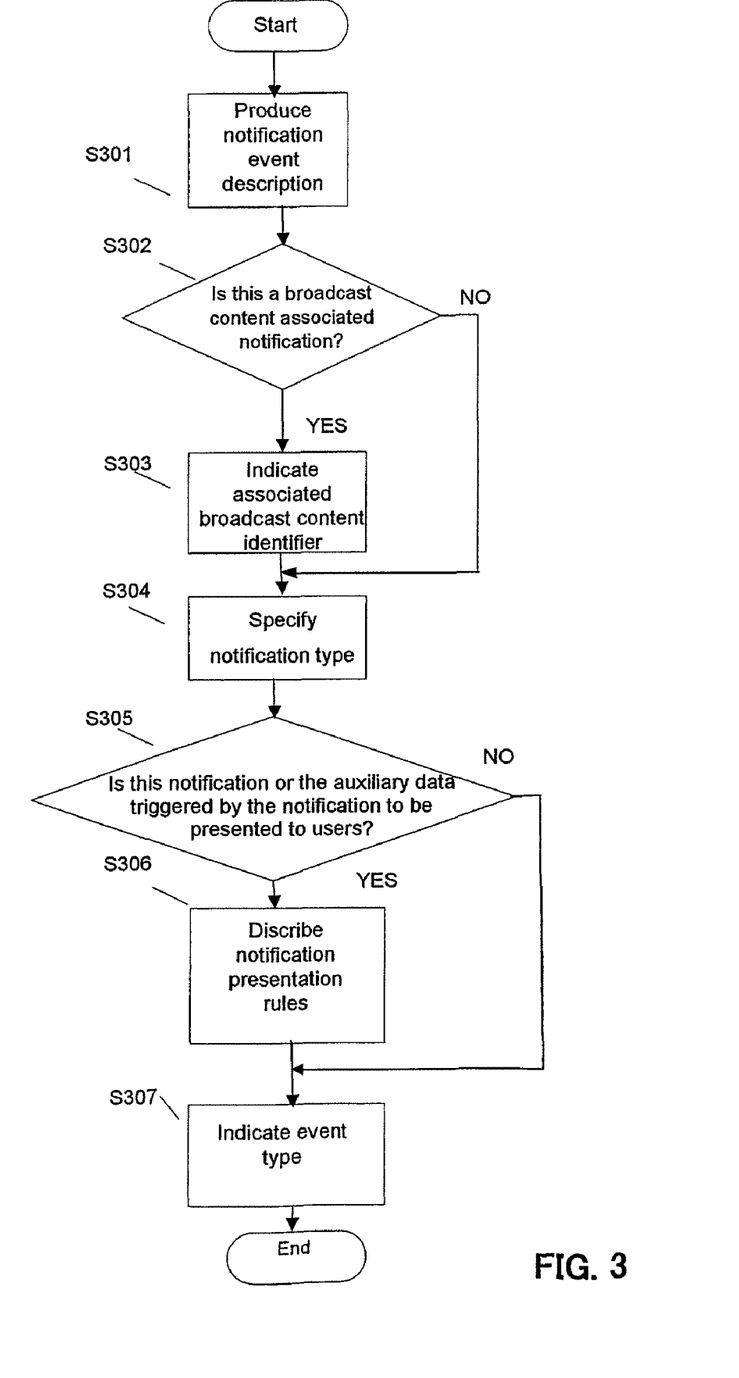
FIG. 3 is a flowchart for generating broadcast content related notification message.

In FIG. 3, the processing steps for generating a broadcast content related notification are illustrated. Note that in the real implementation the sequence of the following steps can be adjusted accordingly.

Firstly, the notification event description is produced (Step S301) to describe the event or information the server wants to convey to terminals or terminal users. The notification event description comprises one or multiple media components for notification message representation, including text, image, audio, video or any combination of the above. Alternatively, the notification event description comprises the identifiers of one or multiple media components including text, image, audio, video or any combination of the above. The notification event description also can comprise the delivery session information of the files or streams to be delivered through the indicated session. The notification event description is a flexible container to comprise or reference any kinds of media data to construct the multimedia notification messages for various purposes.

Secondly, if this is a broadcast content related notification (Step S302), to represent the association of the notification message with the broadcast content, the identifier of the related broadcast content is indicated in the notification message (Step S303). The broadcast content identifier identifies the broadcast service, content or program, using identifiers like URI and URL, or identifies the metadata of the broadcast service, content or program. Further, the metadata of the broadcast service, content or program comprises the identifier of the actual broadcast service, content or program. By referencing this identifier, the terminals can first decide whether the received notification is related to broadcast content which the terminal user is interested in or has subscribed to. If no, the terminal may discard the notification without further process so that the user can avoid being annoyed by unexpected or irrelevant notifications. If yes, the terminal can then easily associate the received notification messages with the relevant broadcast content by referencing this identifier, and carry out necessary actions which may has dependency on the related broadcast content; for example, to display the notification when the related broadcast renders 5 minutes.

Next, the notification type information may be specified in the notification messages (Step S304). Usually notification messages fall into at least two notification types. One type is user-oriented notification messages which should be displayed to users (e.g., service availability notification, file download or update notification, service or content start notification, or promotion notification, etc.). The other type is terminal-oriented notification messages which should only be used for terminal operation and the notification itself should not be displayed to users (e.g., auxiliary data trigger notification).

If this notification or the auxiliary data triggered by the notification is intended to be presented to users (Step S305), the notification presentation rule will also be included in the notification messages (Step S306).

The notification presentation rule can specify the presentation timing of the notification or the auxiliary data triggered by the notification.

There may be a possible presentation timing immediately after the reception of the notification message. For instance, the service availability notification may be displayed to users as soon as it is received so that urgent news (e.g., errors, problems or interruption of the related broadcast services or contents, or abrupt schedule changes of the related broadcast services or contents) can be timely notified to users.

The possible presentation timing can also be a specific time in future indicated in the notification. For instance a promotion notification on a super Christmas promotion for the subscription of CNN channel is indicated to be displayed to users at 12:00 Dec. 24$^{th}$ of 2006 to remind users to catch this good opportunity to save money.

To closely bind the presentation of the notification with the related broadcast content, the presentation timing of the notification can be specified as a time offset before or after the start of the presentation of the related broadcast content indicated in the notification. For instance, auxiliary data trigger notification triggers the insertion of a piece of 2 minutes actors interview clip as auxiliary data 2 minutes before the start of movie "Superman Return". By doing so, the user's interest and expectation to view this movie may be significantly promoted.

If the notification message is not time-sensitive, the network can also allow the presentation timing of the notification to be some time pre-defined by the terminal user, or at any time randomly selected by the terminal or any time freely selected by the user.

In case the presentation timing specified in the notification is already passed or the notification is expired when the notification is received, the overdue notification may be discarded by the terminal without any further processing. If the notification message is received after its valid term, it also will be discarded.

Besides the presentation timing information, the notification presentation rule can also suggest the presentation manner of the notification or the auxiliary data triggered by the notification message and the broadcast content or application displayed at the same time, the possible presentation manner can be in an overlay way, interruption way or other ways. In other words, the presentation rule helps to link the presentation of the notification with the presentation of the related broadcast content in terms of presentation timing, layout, manner, etc., so that the terminal can provide an integrated and smooth notification and content viewing experience to device users.

Besides the above data, the event type may also be specified in the notification messages (Step S307), indicating the detailed event type of the notification message (e.g., service availability notification, file download or update notification, service or content start notification, promotion notification, auxiliary data trigger notification, etc.). Service availability notification notifies the errors, problems or interruption of the related broadcast services or contents, or notifies abrupt schedule changes of the related broadcast services or contents, or notifies the abrupt changes on access entry point of broadcast main service or content, or notifies other information related to the availability of the related broadcast services or contents, etc. The file download or update notification notifies certain files are available for download or update from specific delivery session or URI. The content start notification notifies users that the related broadcast content will commence shortly or at a specific time in future. The promotion notification notifies the promotional activities or events for the related broadcast service or content. The auxiliary data trigger notification triggers either auxiliary data downloading and storage, or auxiliary data insertion, related with the real-time or non-real-time broadcast service or content.

Further, other data like the valid term, priority of the notification messages may also be included in the broadcast content related notification.

Figure 9:
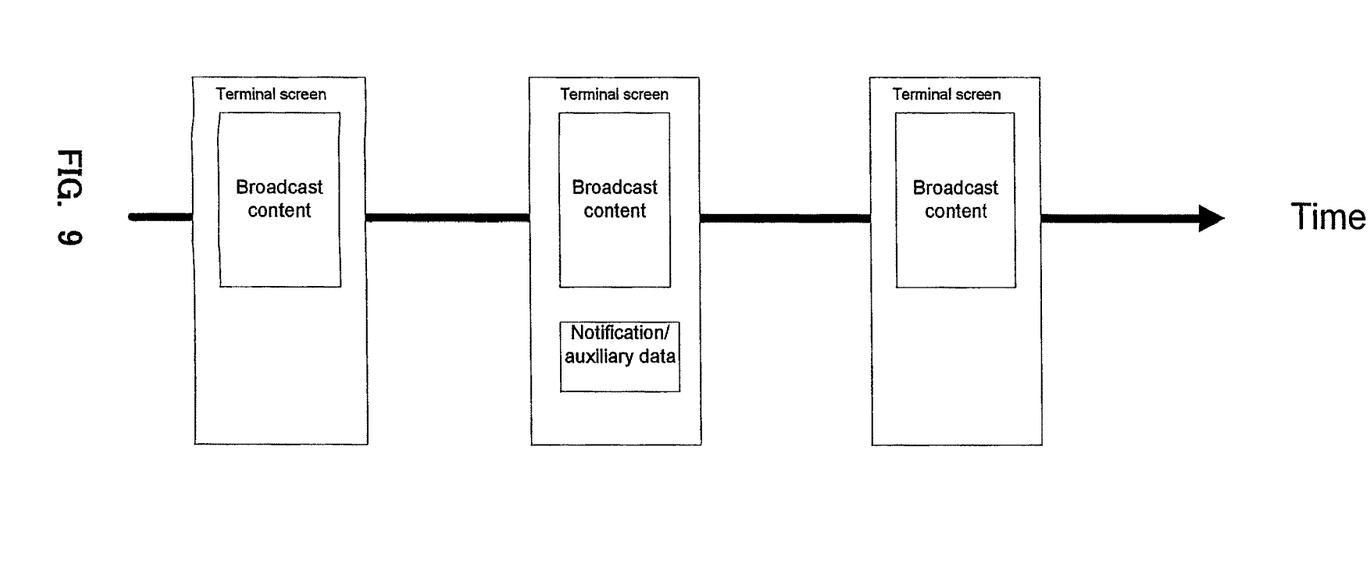
FIG. 9 is a diagram of the overlay presentation of notification or notification triggered auxiliary data.
Figure 10:
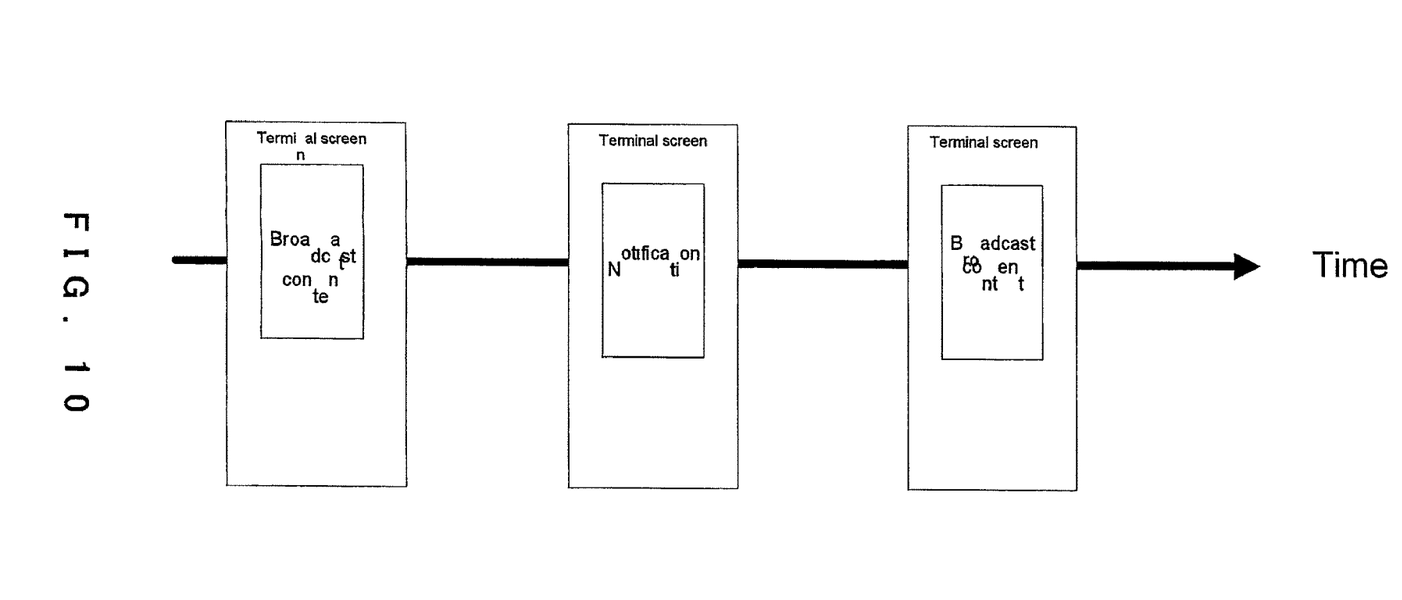
FIG. 10 is a diagram of the interrupt presentation of notification or notification triggered auxiliary data.

FIG. 9 demonstrates the overlay presentation of the notification or the auxiliary data triggered by the notification message with the related broadcast content. In overlay presentation manner, the notification or the auxiliary data triggered by the notification message is simultaneously displayed with the related broadcast content on the terminal screen. FIG. 10 demonstrates the interruption presentation of the notification by interrupting the presentation of the related broadcast content. In interruption presentation manner, the playing broadcast content is suspended and the associated notification is displayed on the terminal screen only. When notification display is finished, the broadcast content display will continue.

The notification presentation rule also can specify the presentation layout of the notification or the auxiliary data triggered by the notification message, using SMIL or other alternative specifications. Also other information like notification name, version, identifier, etc. can be included in the notification message. The sub-steps S11, S12, S13, S14, S15, S16 for generating a broadcast content related notification message can be executed simultaneously or be executed one by one in any order.

Figure 8:
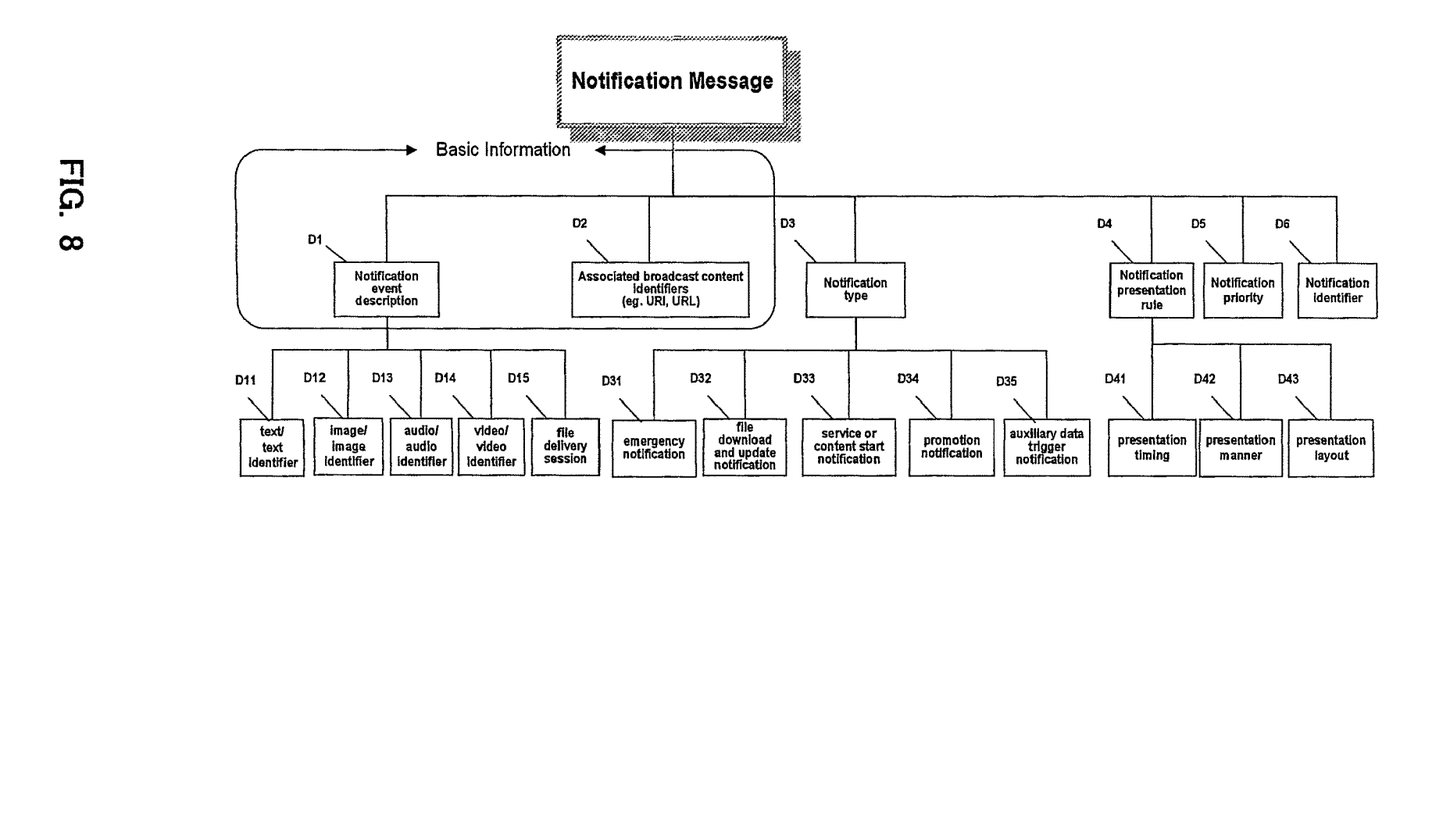
FIG. 8 is a diagram of the data structure of broadcast content related notification message.

FIG. 8 shows the data structure of a broadcast content related notification message. A complete broadcast content related notification message at least comprises notification event description D1, and related broadcast content identifiers D2. A notification message can also comprise event type D3, notification presentation rule D4, notification identifier D6 and other information. Notification event description D1 can further comprises text, image, audio, video, text identifier, image identifier, audio identifier, video identifier, delivery session information or any combination of the above. Related broadcast content identifiers D2 identify the broadcast services, contents or programs using identifiers like URI, URL, or identify the metadata of the broadcast services, contents or programs. Event type D3 can be any type of service availability notification D31, file download or update notification D32, content start notification D33, promotion notification D34, auxiliary data trigger notification D35 or other types. Notification presentation rule D4 further comprises rules like presentation timing D41, presentation manner D42, presentation layout D43, etc.

Figure 4:
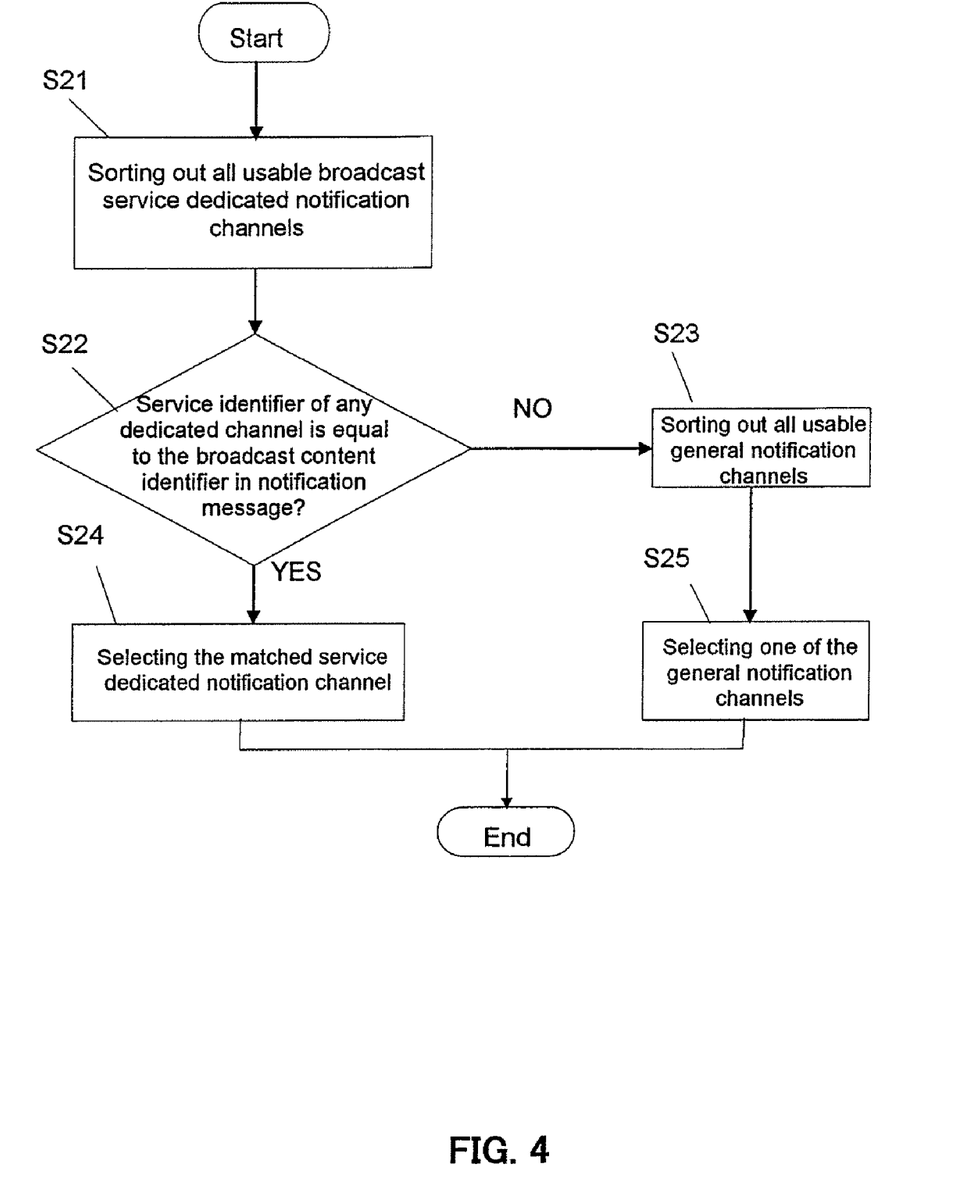
FIG. 4 is a flowchart for selecting notification channel.

Regarding Step S3 mentioned in FIG. 2, FIG. 4 elaborates the details how to select a notification channel for delivery of a notification message. A notification channel can be a general channel for delivery of notification messages for various purposes and various broadcast services. A notification channel also can be a broadcast service specific channel for delivery of notification messages related with particular broadcast service. Firstly, all of the usable broadcast service dedicated notification channels are sorted out (Step S21). Then the service identifiers of all of the broadcast service dedicated channels are compared with the broadcast content identifier in the notification message (Step S22). If the service identifier of one of the broadcast service specific channels is equal to the broadcast content identifier in the notification message, the matched service specific notification channel is selected (Step S24). If the service identifiers of all broadcast service dedicated channels are not equal to the broadcast content identifier in the notification message, all usable general notification channels will be sorted out (Step 23). Then one of the general notification channels is selected if multiple general notification channels are available (Step S25). By selecting a proper notification channel for the notification, the notification messages are categorized for delivery based on their purposes and the association with broadcast service, so that the users can selectively receive notifications by listening to the interested notification channels only.

Regarding Step S6 mentioned in FIG. 2, there are varied embodiments of processing the received broadcast content related notification messages. Three typical embodiments are elaborated below.

Figure 5:
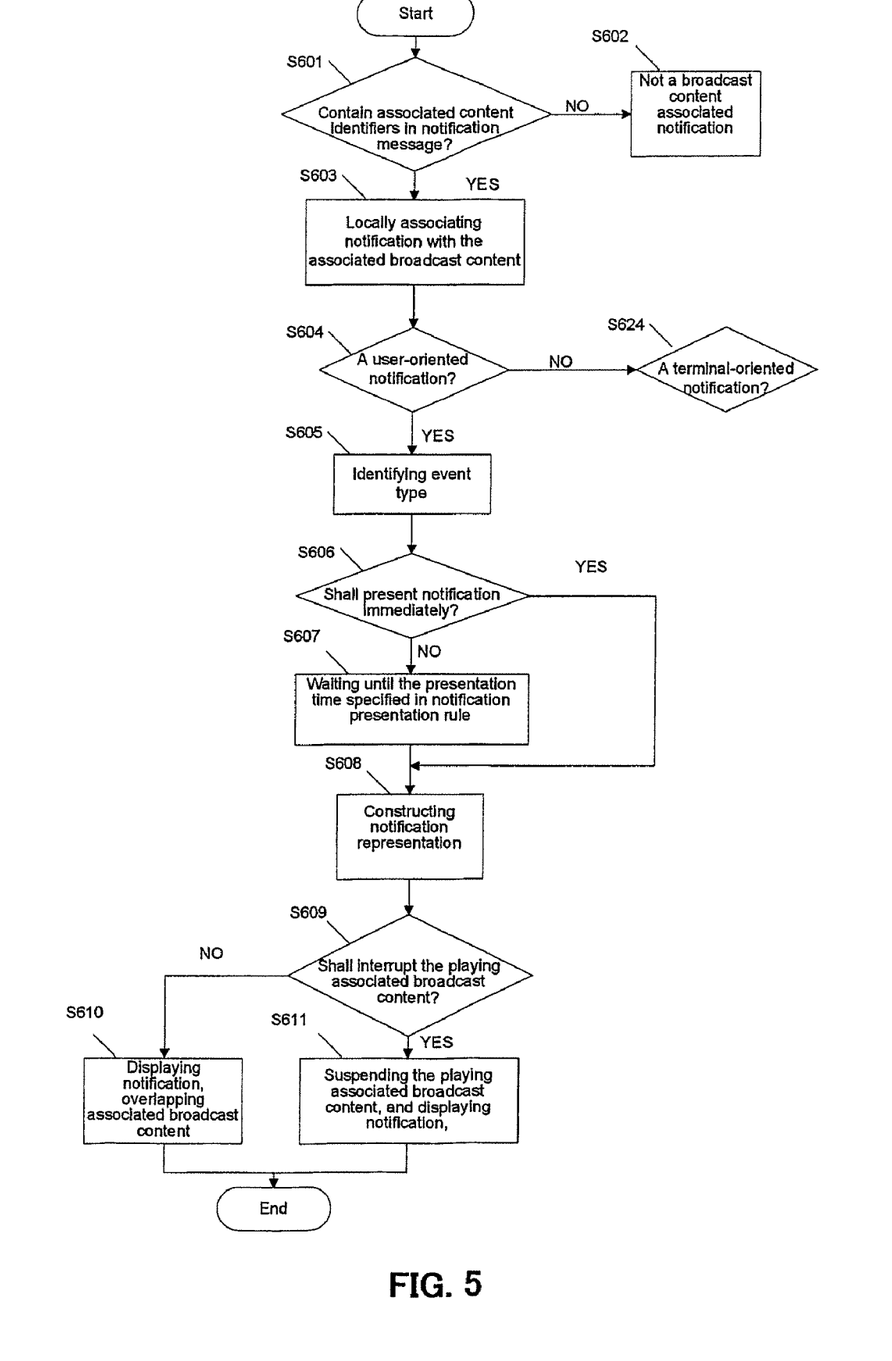
FIG. 5 is a flowchart for processing user-oriented notification message and synchronously displaying the notification message and the related broadcast content.

FIG. 5 shows an embodiment for processing user-oriented notification message and synchronously displaying the notification message and the related broadcast content. Firstly, the terminal verifies if the notification message contains related content identifiers therein (Step S601). If no, that means this notification message is not a broadcast content related notification message, which will be out of the scope this invention (Step S602). If yes, the notification message will be locally related with the broadcast content referenced in the notification message (Step S603). Then, it is judged by the terminal with the notification type if the notification message is a user-oriented notification (Step S604). If no, it will be judged if the notification message is a terminal-oriented notification or a user-oriented notification message or a notification in other type. In this embodiment, the notification is a user-oriented notification message and the presentation of the notification should be synchronized with the presentation of the related broadcast content. For synchronized presentation, the notification presentation timing is dependent on the presentation schedule of the related broadcast content, for example, to render the notification immediately before or after the presentation of the broadcast content, or at some time offset relative to the start of the presentation of the related broadcast content. Detailed event type may be further identified (Step S605). Then the terminal decides if the notification should be presented immediately or not, based on the notification presentation timing and the presentation schedule of the related broadcast content (Step S606). If the notification message is to be presented at time later on, the terminal will store the notification and set an alarm to trigger the activation of notification presentation (Step S607). The alarm timing in this embodiment is closely related to the schedule of related broadcast content. When the time of displaying the notification arrives, the notification representation is constructed and rendered according to the notification event description (Step S608). Meanwhile the related broadcast content is synchronously rendered. The notification presentation rule indicates the presentation manner of the notification (Step S609), displaying the notification overlapping the related broadcast content (Step S610), or suspending the playing of the related broadcast content to display the notification first and then continue displaying the related broadcast content (Step S611).

Figure 6:
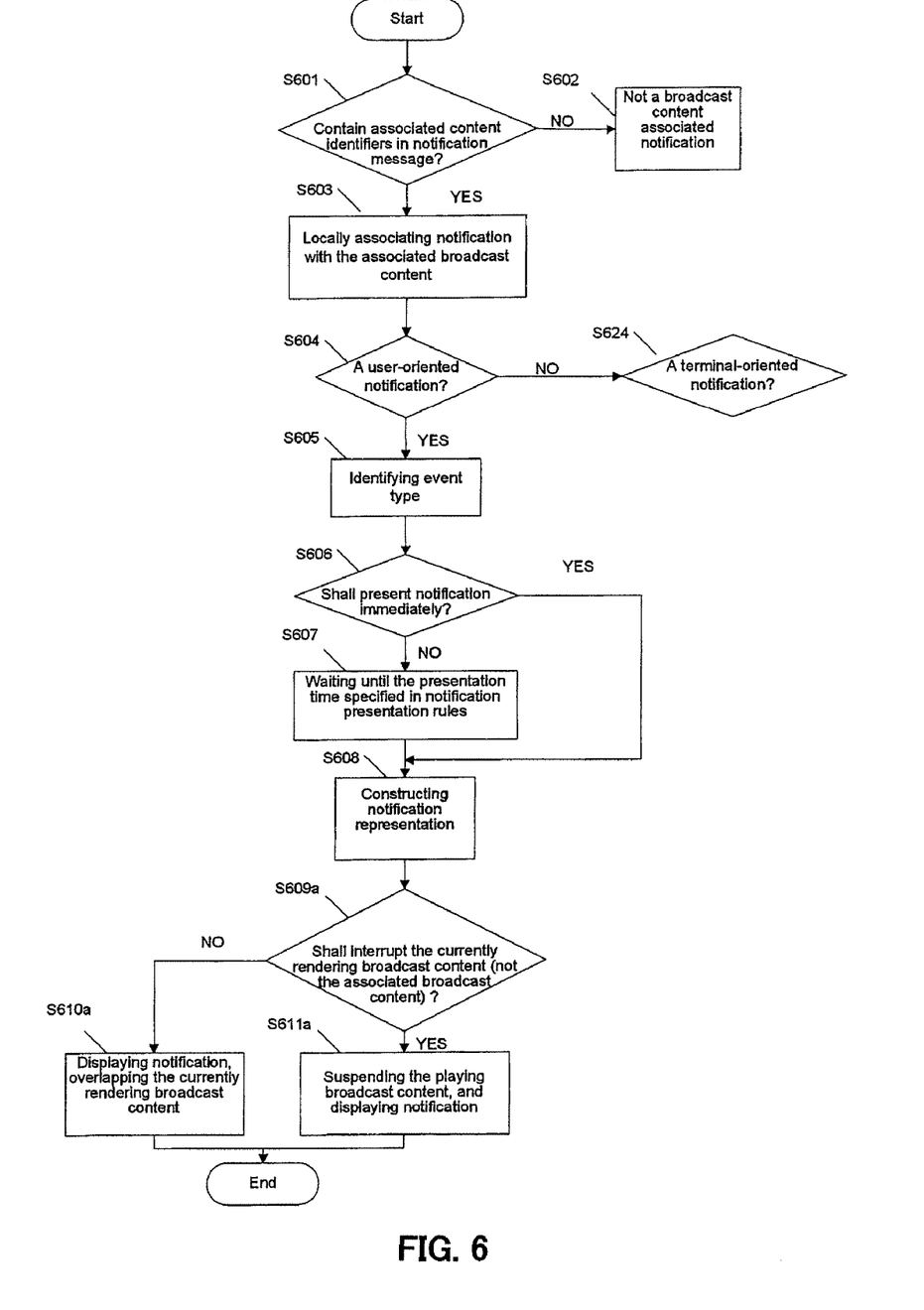
FIG. 6 is a flowchart for processing user-oriented notification message and asynchronously displaying the notification message and the related broadcast content.

FIG. 6 represents an embodiment for processing user-oriented notification message and asynchronously displaying the notification message and the related broadcast content. Most steps in this embodiment are the same with the first embodiment described above. The difference is that if the presentation timing of the notification message is asynchronous to presentation timing of the related broadcast content, this notification message will be displayed according to its own schedule specified by presentation rule and needs not to coordinate with the schedule of the related broadcast content. In this asynchronous mode, the possible presentation timing can be immediately after the reception of the notification, or some specific time indicated in the notification. If the notification does not explicitly define the presentation timing, it can also be some time pre-defined by the users, or randomly selected by terminal or the user. In this embodiment the terminal may also need to check the presentation manner specified in the notification presentation rule which indicates how to present if there is running content of program when the notification is supposed to be rendered (Step S609a). According to the presentation manner, the notification is either displayed overlapping the currently running program or content (Step S610a), or displayed by suspending the running program or content (Step S611a). This running program or content maybe the related broadcast content identified in the notification, or other content which has no relation with this notification.

Figure 7:
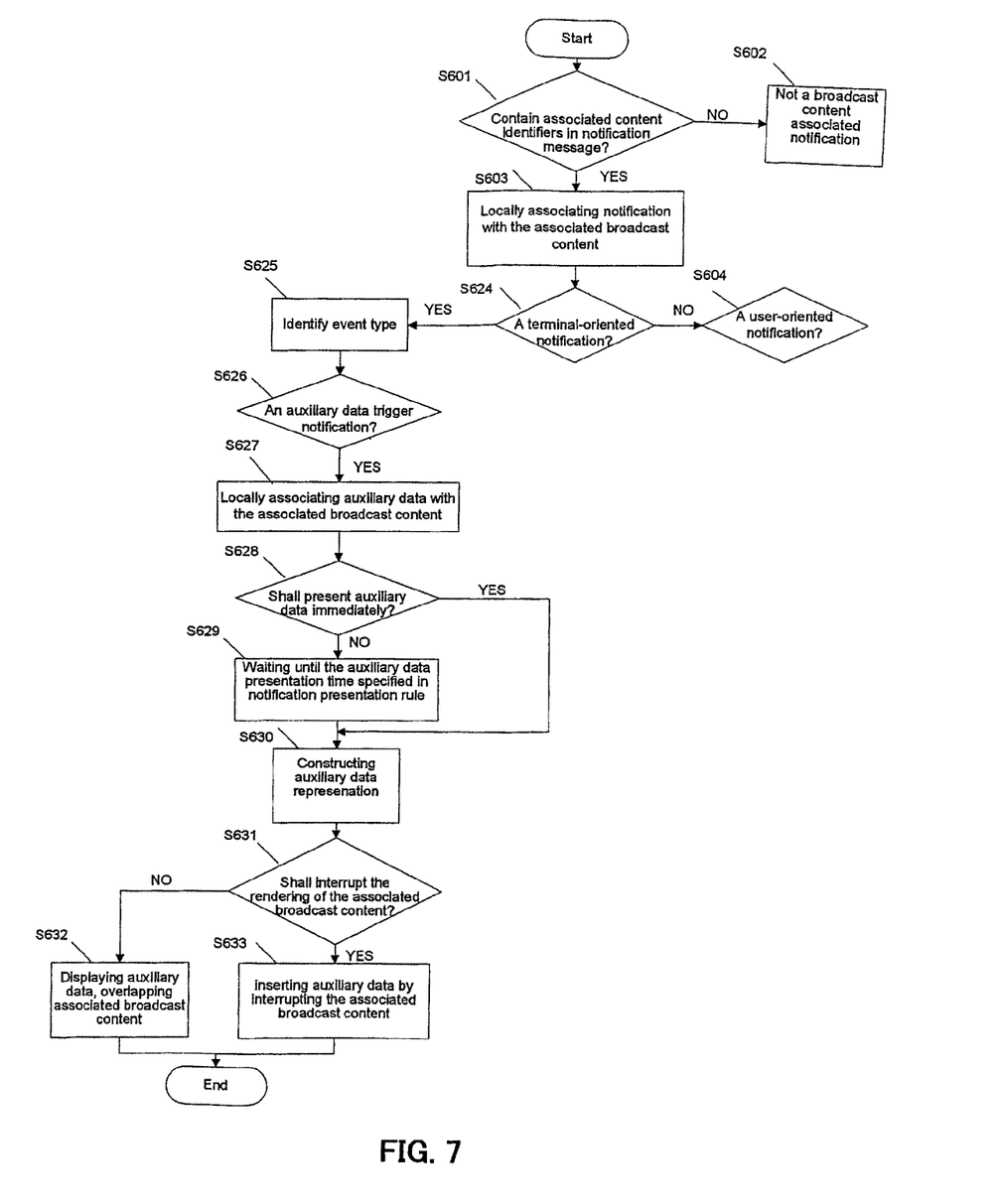
FIG. 7 is a flowchart for processing auxiliary data trigger notification message.

The third typical embodiment in FIG. 7 is not for processing a user-oriented notification message, but a terminal-oriented notification message, more particularly, for processing an auxiliary data trigger notification message. Firstly, the terminal still verifies if the notification message contains related content identifiers therein (Step S601), if no, that means this is not a broadcast content related notification message, which will be out of the scope this invention. If yes, the notification message will be locally related with the broadcast content referenced in the notification message (Step S603). Then, it is judged by the terminal with the notification type if the notification message is a terminal-oriented notification (Step S624). If no, it will be judged if the notification message is a user-oriented notification in which case the notification is processed as embodiments in FIG. 5 or FIG. 6. If yes, detailed event type may be further identified (Step S625).Then, it is judged by the terminal if the notification message is an auxiliary data trigger notification (Step S626). If no, the notification message will be discarded by the terminal without any further processing. If yes, the terminal will locally associate the auxiliary data carried or reference by the notification with the related broadcast content (Step 627). In some cases, multiple auxiliary data is selectable for a specific auxiliary data insertion event, then the auxiliary data trigger notification will contain filtering criteria to support customization of auxiliary data storage, insertion and presentation on the terminal. In this embodiment, the presentation of the auxiliary data is to be synchronized with the presentation of the related broadcast content, because the auxiliary data here is the supplementary or enhancement media for the related broadcast content, presented before, after or during the related broadcast content presentation. However, in other embodiments, the presentation of the auxiliary data may also not synchronize with the presentation of the related broadcast content. The auxiliary data presentation time for synchronous mode, the auxiliary data presentation timing is dependent on the presentation schedule of the related broadcast content, for example, to render the n auxiliary data immediately before or after the presentation of the broadcast content, or at some time offset relative to the start of the presentation of the related broadcast content. Detailed event type may be further identified (Step S605). If the auxiliary data is not supposed to be rendered immediately (Step S628), the terminal waits and the auxiliary data trigger notification is stored until the auxiliary data presentation time specified in the notification presentation rule arrives (Step S629). Similar to the first embodiment, an alarm to activate the auxiliary data presentation is also set by the terminal based on the presentation timing of the auxiliary data and the schedule of the related broadcast content. When the presentation timing of the auxiliary data arrives, the auxiliary data is constructed (Step S630) and represented with the manner indicated by the presentation rule (Step S631), displaying the auxiliary data overlapping the related broadcast content (Step S632), or inserting the auxiliary data by interrupting the related broadcast content (Step S633). From viewers' perspective, the auxiliary data are integrated into the view of the related broadcast content as part of it. Using notification to trigger the rendering of pre-download media data such as auxiliary data can facilitate the terminal to dynamically and flexibly insert the pre-download media data into the broadcast content, and provides a synchronized presentation of the pre-download media data and the broadcast content to users. With this mechanism, the network also can save bandwidth by sending media data once but re-using them multiple times on terminals. The typical use case is to pre-download advertisement and repeatedly display them to users once notification triggers the insertion.

Figure 11:
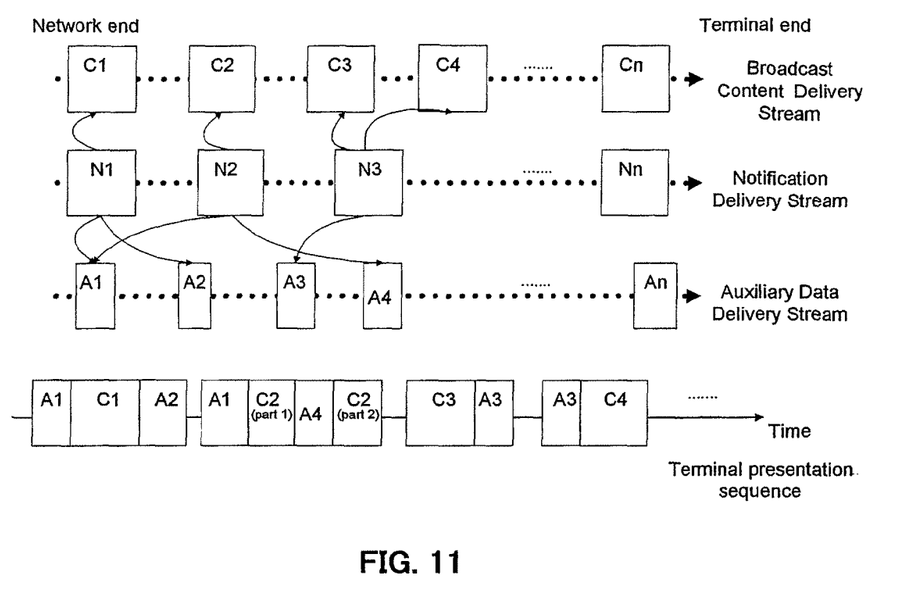
FIG. 11 is a diagram of delivering broadcast contents, notification messages and auxiliary data, and reconstructing the terminal presentation by inserting auxiliary data into the related broadcast content.

To further elaborate the embodiment of processing auxiliary data trigger notifications, FIG. 11 demonstrates that multiple broadcast contents, auxiliary data trigger notifications and auxiliary data are delivered from network to terminals separately. As the bridge between broadcast contents and related auxiliary data, notification messages comprise the identifiers of the broadcast contents and the related auxiliary data, consequently linking the broadcast contents with relevant auxiliary data. One notification message can contains one or multiple broadcast content identifier. One notification message also can comprise one or multiple auxiliary data items. For the auxiliary data and the broadcast content identified within the same auxiliary data trigger notification message, the notification message triggers the insertion of the auxiliary data into the presentation of the related broadcast content. The actual presentation sequence, timing, manner and layout of the auxiliary data and the related broadcast content are determined by the notification presentation rule and the broadcast content schedule.

This application is based on the U.S. Provisional Application No. 60/759,055 filed on Jan. 17, 2006, entire content of which is expressly incorporated by reference herein.

Industrial Applicability

The present invention is applicable to broadcasting services. Especially, the present invention is applicable to mobile broadcasting services, where broadcast content related notification is used to dynamically communicate broadcast content related information to one or multiple users and terminals and enhance user satisfaction of the broadcasting services.

The invention claimed is:

1. An apparatus comprising:
   a generation unit configured to generates a notification message, the notification message including:
   a broadcast identifier identifying a broadcast; and
   presentation timing information indicating when media information related to and distinct from the broadcast is to be displayed, wherein the presentation timing control information includes at least one of:
   an indication to display the media information immediately after receiving the notification message;
   an indication to display the media information relative to a time when the broadcast is to be displayed;
   an indication of an offset of a fixed duration;
   an indication of a specific time to display the media information; and
   an indication that the media information may be displayed at a user-selection time; and
   a transmission unit configured to transmit the notification message.

2. The apparatus according to claim 1 wherein the generation unit is configured to include presentation manner information in the notification message and when the timing information indicates the media information is to be displayed immediately after receiving the notification message, the presentation manner information indicates the media information is to be displayed by at least one of interrupting the broadcast and overlaying the broadcast.

3. The apparatus according to claim 1 wherein the generation unit is configured to include a media identifier in the notification message, the media identifier identifying the media information related to the broadcast from among a plurality of pieces of media information.

4. The apparatus according to claim 1 wherein the timing information indicates a time to display the media information relative to a time when the broadcast is to be displayed.

5. The apparatus of claim 4 wherein the timing information is an offset of a fixed duration.

6. The apparatus of claim 1 wherein the broadcast includes content from a broadcast service and media information related to the broadcast service is related to the broadcast.

7. The apparatus of claim 1 wherein the generation unit is configured to include the media information related to the broadcast in the notification message.

8. The apparatus of claim 1 wherein the media information includes scheduling information related to the broadcast.

9. An apparatus comprising:
   a broadcast reception unit configured to receive broadcasts;
   a notification message reception unit configured to receive notification messages and extract broadcast identifiers and presentation timing information from notification messages, the timing information indicating when media information related to and distinct from received broadcasts is to be displayed, wherein the presentation timing information includes at least one of:
   an indication to display the media information immediately after receiving the notification message;
   an indication to display the media information relative to a time when a broadcast is to be displayed;
   an indication of an offset of a fixed duration;
   an indication of a specific time to display the media information; and
   an indication that the media information may be displayed at a user-selected time;

a storing unit configured to store media information related to and distinct from received broadcasts; and
a display unit configured to:
display broadcasts; and
display media information related to broadcasts based on broadcast identifiers and timing information extracted from notification messages.

10. The apparatus according to claim 9 wherein the notification message reception unit is configured to extract presentation manner information from notification messages and the display unit is configured to, when timing information extracted from a notification message indicates selected media information is to be displayed immediately, display the selected media information by at least one of interrupting a broadcast and overlaying the broadcast according to extracted presentation manner information.

11. The apparatus according to claim 9 wherein
the notification message reception unit is configured to extract media identifiers from notification messages, the media identifiers identifying at least one piece of media information stored in the storing unit; and
the display unit is configured to display media information based on the extracted media identifiers.

12. The receiving apparatus according to claim 9 wherein the display unit is configured to, when extracted timing information indicates a relative time to display media information with respect to display of a broadcast, determine when to display media information based on the extracted timing information and a time of display of the broadcast.

13. A method, comprising:
transmitting media information related to and distinct from a broadcast;
generating a notification message including:
presentation timing information indicating when to display the media information related to and distinct from the broadcast wherein the presentation timing information includes at least one of:
an indication to display the media information immediately after receiving the notification message;
an indication to display the media information relative to a time when the broadcast is to be displayed;
an indication of an offset of a fixed duration;
an indication of a specific time to display the media information; and
an indication that the media information may be displayed at a user-selected time; and
a broadcast identifier identifying the broadcast; and
transmitting the notification message.

14. The method according to claim 13 wherein when the timing information indicates the media information is to be displayed immediately after the notification message is received, the generating the notification message comprises including presentation manner information in the notification message, the presentation manner information including at least one of:
an indication that the media information is to be displayed by interrupting the broadcast; and
an indication that the media information is to be displayed by overlaying the broadcast.

15. The method according to claim 13 wherein the generating the notification message comprises including in the notification message a media identifier identifying the media information relating to and distinct from the broadcast from among a plurality of pieces of media information.

16. The method according to claim 13 wherein the timing information indicating when to display the media information indicates a relative timing with respect to a timing of the broadcast.

17. A method, comprising:
receiving a broadcast;
storing media information related to and distinct from the broadcast;
receiving a notification message including a broadcast identifier identifying the broadcast and presentation timing information indicating when to display the media information related to and distinct from the broadcast wherein the presentation timing information includes at least one of:
an indication to display the media information immediately after receiving the notification message;
an indication to display the media information relative to a time when the broadcast is to be displayed;
an indication of an offset of a fixed duration;
an indication of a specific time to display the media information; and an indication that the media information may be displayed at a user-selected time;
displaying the broadcast; and
displaying the media information related to and distinct from the broadcast based on the timing information included in the notification message.

18. The method according to claim 17 wherein
the notification message includes presentation manner information and the timing information indicates the media information is to be displayed immediately after the notification message is received; and
displaying the media information comprises at least one of interrupting the display of the broadcast and overlaying the display of the broadcast based on the presentation manner information.

19. The method according to claim 17 wherein
the notification message includes a media identifier identifying at least one piece of stored media information; and
displaying the media information comprises displaying the at least one piece of stored media information identified by the media identifier.

20. The method according to claim 17 wherein
the timing information indicates a relative timing when the media information is to be displayed with respect to display of the broadcast; and
displaying the media information comprises determining when to display the media information based on the timing information and a time when the broadcast is to be displayed.

21. The method of claim 17 wherein receiving the notification message comprises receiving media information related to the broadcast included in the notification message and the storing media information related to the broadcast comprises storing the media information included in the notification message.

22. The method of claim 17 wherein the broadcast is a broadcast of a broadcast service and the media information is related to the broadcast service.

23. The method of claim 17 wherein displaying the broadcast comprises displaying content of the broadcast.

* * * * *